Feb. 24, 1959 R. C. MOORE ET AL 2,875,271

COLOR TELEVISION SYSTEM

Filed Nov. 10, 1951 4 Sheets-Sheet 1

INVENTORS
ROBERT C. MOORE
JOHN B. CHATTEN
BY Allen V. Hazeltine
ATTORNEY

COLOR TELEVISION SYSTEM

Filed Nov. 10, 1951 4 Sheets-Sheet 2

INVENTORS
ROBERT C. MOORE
JOHN B. CHATTEN
BY
Allen V. Hazeltine
ATTORNEY

INVENTORS
ROBERT C. MOORE
JOHN B. CHATTEN
BY
Allen V. Hazeltine
ATTORNEY

INVENTORS
ROBERT C. MOORE
JOHN B. CHATTEN
BY Allen V. Hazeltine
ATTORNEY

United States Patent Office 2,875,271

Patented Feb. 24, 1959

2,875,271

COLOR TELEVISION SYSTEM

Robert C. Moore, Erdenheim, and John B. Chatten, Philadelphia, Pa., assignors to Philco Corporation, Philadelphia, Pa., a corporation of Pennsylvania Application November 10, 1951, Serial No. 255,776

21 Claims. (Cl. 178—5.2)

The present invention relates to systems for the transmission of electrical signals representative of the specifications of colors, and more particularly to apparatus for transmitting and receiving color television images.

In color television systems in general, two important factors to be evaluated in estimating system performance are compatibility and noise performance. The degree of compatibility of a system is indicative of the extent to which its transmission are susceptible of reception by a standard black-and-white television receiver to produce therein a satisfactory monochrome version of the color image, while the noise performance determines the extent to which the color image formed by an appropriate color television receiver is free from visually objectionable effects produced therein by interfering signals such as electrical noise. The present invention makes possible improvements in either or both the compatibility and noise performance of such color television systems.

One class of color television systems to which the present invention is particularly applicable, but to which it is by no means limited, is shown and described in detail in the copending application Ser. No. 225,567, filed May 10, 1951, of Frank J. Bingley for an "Electrical System." In such systems, the color image at the transmitter is preferably analyzed into signals representative of its Y, $X-Y$ and $Z-Y$ values, where X, Y and Z correspond to the three well-known imaginary primaries defined by the International Commission on Illumination. The Y value of each color indicates the brightness thereof, and may be represented by a proportionally-varying electrical signal termed the Y signal. This Y signal is preferably transmitted, in a frequency band extending from zero to a predetermined upper frequency limit, in a manner similar to that employed in conventional monochrome television systems, and is susceptible to reception by a standard monochrome receiver to produce therein a highly satisfactory black-and-white version of the color image. In the color receiver, the Y signal is applied to the real primary-color producing devices utilized for image synthesis, in such proportions that there is produced an achromatic version of the color image which is similar to that produced in the aforementioned black-and-white receiver. The effect of the Y signal is therefore to establish the proper brightness of the color image, without introducing chroma thereinto.

To implement reproduction of the chroma of the color image, there are preferably generated, at the transmitter, two signals representative of the departures from white of the various colors represented, in respect of their X and Z components respecitvely, it being understood that the X, Y and Z values are all equal for white. Thus there are formed signals proportional to the $X-Y$ and $Z-Y$ values of the colors, which difference signals are zero when representing white, and which depart from zero in accordance with departures of the X and Z compenents thereof from the values which they possess when representing white of the same brightness.

In this system of the above-cited Bingley application, the $X-Y$ and $Z-Y$ signals formed may be caused to effect balanced amplitude-modulation of a pair of similar subcarrier signals which may be in quadrature phase relation. The two amplitude-modulated subcarrier signals thus produced are then additively combined to produce a resultant subcarrier signal, which subcarrier signal has a phase indicative of the relative amplitudes of the two separate subcarrier signals, and therefore indicative of the hue of colors represented, and an amplitude dependent upon the absolute magnitudes of the two separate subcarrier signals and thus representative of the saturation of the colors represented. The frequency bandwidth of the amplitude-modulated, resultant-subcarrier signal, and the subcarrier signal frequency itself, are preferably so arranged that the subcarrier frequency band lies adjacent the upper end of the frequency band occupied by the Y signal described hereinbefore, although some band-overlap is sometimes permissible. The Y signal and the resultant subcarrier signal representative of $X-Y$ and $Z-Y$ information may then be transmitted simultaneously in substantially mutually-exclusive frequency bands.

The subcarrier frequency employed in this instance is preferably also chosen to be an odd integral multiple of one-half the standard horizontal line-scanning frequency utilized for television purposes, for the reason that the tendency for the subcarrier signal to affect the compatibility of the system adversely, is then substantially reduced. Thus, the resultant subcarrier signal, when received by a wide-band standard monochrome receiver, tends to produce modulation of the brightness of the monochrome image, resulting in the production of a dot-pattern in the image; however, due to the above-indicated choice of subcarrier frequency, the subcarrier signals are in opposite phases during successive frames so that they tend to cancel, and their average effect, as observed by the human eye, is thereby reduced very substantially. Nevertheless, due to unavoidable imperfections in the system, this cancellation is usually not entirely complete, and some residual interference in the monochrome image will generally result when chromatic subject matter is represented. When achromatic subject matter is represented, the chroma subcarrier is of substantially zero amplitude and produces no appreciable interfering effects.

From the viewpoint of compatibility then, it would be desirable in such prior art systems to reduce the maximum amplitude of the resultant subcarrier signal, relative to the maximum amplitude of the Y signal, thereby to reduce the maximum strength of the visually-objectionable interference produced in standard monochrome receivers. However, merely to reduce the gain accorded the resultant subcarrier signal produced at the transmitter, would effect deleteriously the noise performance of the color receiver. This will be appreciated from the fact that, as the gain provided for the resultant-subcarrier signal is decreased at the transmitter, a corresponding increase in the gain of the receiver must be employed, and a corresponding increase in the amount of electrical noise produced at the color-image reproducing apparatus will result. Furthermore, since electrical noise having relatively strong frequency components in the subcarrier frequency band is heterodyned to lower frequencies in the receiver demodulation process, the effects of noise in the subcarrier channel may tend to produce low-frequency interference of highly-objectionable visibility.

In systems of the above-described class, the requirements of compatibility and noise performance have therefore been considered antithetical heretofore, and it has been customary to reduce the gain accorded the resultant-subcarrier signal at the transmitter only sufficiently to provide an acceptable degree of compatibility, and then to increase the level of both Y signal and subcarrier signal until the noise performance of color receivers, located in the areas to be served, is satisfactory. It would therefore be highly desirable in such a system to improve either the noise performance or the compatibility, without deleteriously affecting the other, or to improve both characteristics of the systems simultaneously.

Accordingly, it is an object of our invention to provide a system for the transmission of intelligence as to the specifications of colors, in which system either the compatibility of the system with respect to reception by monochrome receivers may be improved without deleteriously affecting the noise performance of the system, or in which the noise performance of the system may be improved without producing a corresponding reduction in the compatibility of the system.

Another object is to provide such a system in which both the compatibility of the system and the noise performance may be improved simultaneously.

A further object is to provide a color television system in which either or both the compatibility and noise performance are improved, by arranging the system to take advantage of certain psycho-physical characteristics of the average human eye.

Another object is to provide a system for the generation of color-specifying transmissions of improved form with regard to their susceptibility to reception by standard monochrome receivers and by color-image reproducing receivers.

Still another object is to provide a color television transmitter arrangement employing a modulated subcarrier to represent the hue and saturation of colors, by means of which arrangement the maximum interfering effects of the subcarrier upon standard monochrome receivers and of electrical noise upon color receivers, may be substantially reduced.

It is a further object of the invention to provide a color television receiver adapted to receive the transmissions of the above-mentioned transmitter, and to reproduce therefrom color images in which the deleterious effects of noise interference may be substantially reduced with respect to receivers not employing the invention.

In accordance with our invention, the above objectives are achieved by utilizing a transmitting arrangement in which the proportionality factor $K_X$, which expresses the relation between variations in only the X values of the color image and the variations produced thereby in the transmitter output signal, exceeds the proportionality factor $K_Z$, expressing the relation between variations in only the Z values of the color image and the variations produced thereby in the transmitter output signals, by a factor R which is substantially greater than unity. In the color receiver, at a point following that at which noise producing objectionable interference is unavoidably injected into the system, the signals which are operative to control the X and Z values of the reproduced image are then modified in an inverse manner, so as to be related to the X and Z values of the original image by proportionality constants of substantially identical values. This system operation may be obtained by providing a transmitter gain for the X-value representing signals which is R times greater than that provided for the Z-value representing signals, and by providing a receiver gain which is R times greater for the Z-value representing signals than for the X-value representing signals. The factor R is preferably substantially equal to the ratio of the maximum sensitivity of the average human eye for changes in only the X-values of colors of any specified brightness, to the maximum sensitivity of the average human eye for changes in only the Z values of colors of said specified brightness.

Numerically, it has been found that the variations produced by $X-Y$ signals in one subcarrier signal may preferably be substantially three times as great as those produced in the envelope of the other subcarrier signal by the $Z-Y$ signals. At the receiver, the gain provided for the $Z-Y$ signals should then be greater than that provided for the $X-Y$ signals by this same factor, if the receiver is to be otherwise conventional.

The theoretical basis of our invention involves the following facts. When considering only colors of the same brightness, such as those established by each value of the Y signal in the receiver of the presently proposed system, the sensitivity of the average human eye to variations in chromaticity alone is different for different types of variation. More particularly, for all real colors of the same brightness, the eye has substantially its maximum sensitivity for chromaticity deviations corresponding to changes in only the X values of colors, and has substantially its minimum sensitivity for changes in only the Z values of these colors. Specifically, the maximum eye sensitivity for chromaticity changes due to variations in only the X values of colors of any specified brightness is substantially three times as great as the maximum eye sensitivity for changes in only the Z values of colors of that brightness.

As a result, the substantially equal electrical noise which would be produced in the $X-Y$ and $Z-Y$ channels of a color receiver in response to transmissions containing equal proportions of the $X-Y$ and $Z-Y$ signals, would produce greater subjective chromaticity changes when effecting variations in the X value of the reproduced image, than when effecting equal variations in the Z value thereof. With such an arrangement, the subjective noise performance of the color television system is therefore limited chiefly by the effects of noise in varying the X value of the reproduced color. However, by employing the arrangement of the present invention, the subjective effects of electrical noise in varying the chromaticity of the reproduced color image are more nearly equalized with regard to changes in the X and Z values of the colors represented. The ratio of the maximum resultant-subcarrier amplitude to the maximum Y signal amplitude may then be adjusted to a new compromise between compatibility and noise performance which provides improved over-all system operation.

It is convenient to compare the arrangement of the present invention with a reference system in which the proportionality factors $K_X$ and $K_Z$ are equal, and in which the Y signal is transmitted with a predetermined maximum level suitable for a particular application. In accordance with the invention, one may maintain the maximum Y signal at the transmitter at the value employed in the above reference system, and similarly maintain the $X-Y$ signal variation at the level previously employed, while reducing the maximum amplitude of the $Z-Y$ variations by a factor of three, for example. At the receiver, the channel through which the separated $Z-Y$ signals pass may then be provided with a gain substantially three times that formerly employed, so as to produce the same desired level of $Z-Y$ signal for application to the image-reproducing portion of the receiver. Although the $Z-Y$ signals will then be accompanied by three times greater electrical noise, the maximum subjective effects of this noise will still be no greater than the maximum subjective effects produced by the noise in the $X-Y$ channel of the receiver, and the subjective noise effects produced by both receiver channels in combination will not be greatly increased. At the same time the compatibility of the system is enhanced very substantially, as will be apparent from the following.

The maximum amplitude of the resultant subcarrier from the transmitter is determined by the vector sum of the $X-Y$ and $Z-Y$ subcarrier signals, in quadrature in the present case. This amplitude will be decreased by decreasing either of the two quadrature-related signals, and is decreased particularly rapidly by decreasing the maximum amplitude of the quadrature signal having the greatest amplitude. In general, with "white" illuminants for the scene to be televised which are substantially of equal energy throughout the visible spectrum, the maximum $Z-Y$ value which will be encountered in reproducing any color will be substantially three times the maximum $X-Y$ value encountered. As a result, reduction of the maximum amplitude of the $Z-Y$ signals by a factor of three, as exemplified hereinbefore, tends more nearly to equalize the maximum values of the $X-Y$ and $Z-Y$ subcarriers which will be required to reproduce the colors of the televised scene when illuminated with standard white illuminants, for example. Due to the reduction in the large $Z-Y$ component, a very substantial reduction in the resultant total subcarrier vector is obtained, and the residual interfering effects of the resultant chroma subcarrier upon a standard monochrome receiver are thereby greatly reduced.

With this arrangement of the relative amplitudes of the quadrature signal components in accordance with the invention, one may alternatively increase the level of the resultant-subcarrier until the interference produced in the standard monochrome receiver is equal to that formerly obtained with prior art systems, in which event the gains of the $X-Y$ and $Z-Y$ channels in the color receiver may be decreased correspondingly, and the maximum subjective noise interference in the color receiver is thereby proportionately decreased. Other adjustments of the maximum amplitude of the resultant subcarrier signal compared to the maximum amplitude of the Y signal may also be made, depending upon the particular application of the system, and with each of these adjustments the performance of the system will be improved over that of prior art systems when both compatibility and noise performance are considered.

Other objects and features of the invention will be more readily appreciated from a consideration of the following detailed description in connection with the accompanying drawings, in which.

Figure 5:
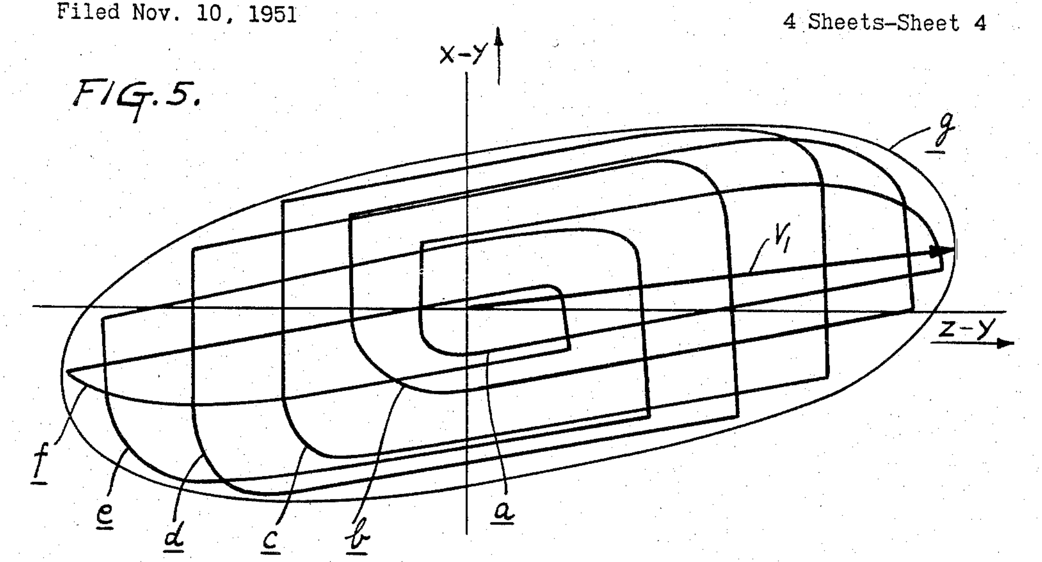
Figure 6:
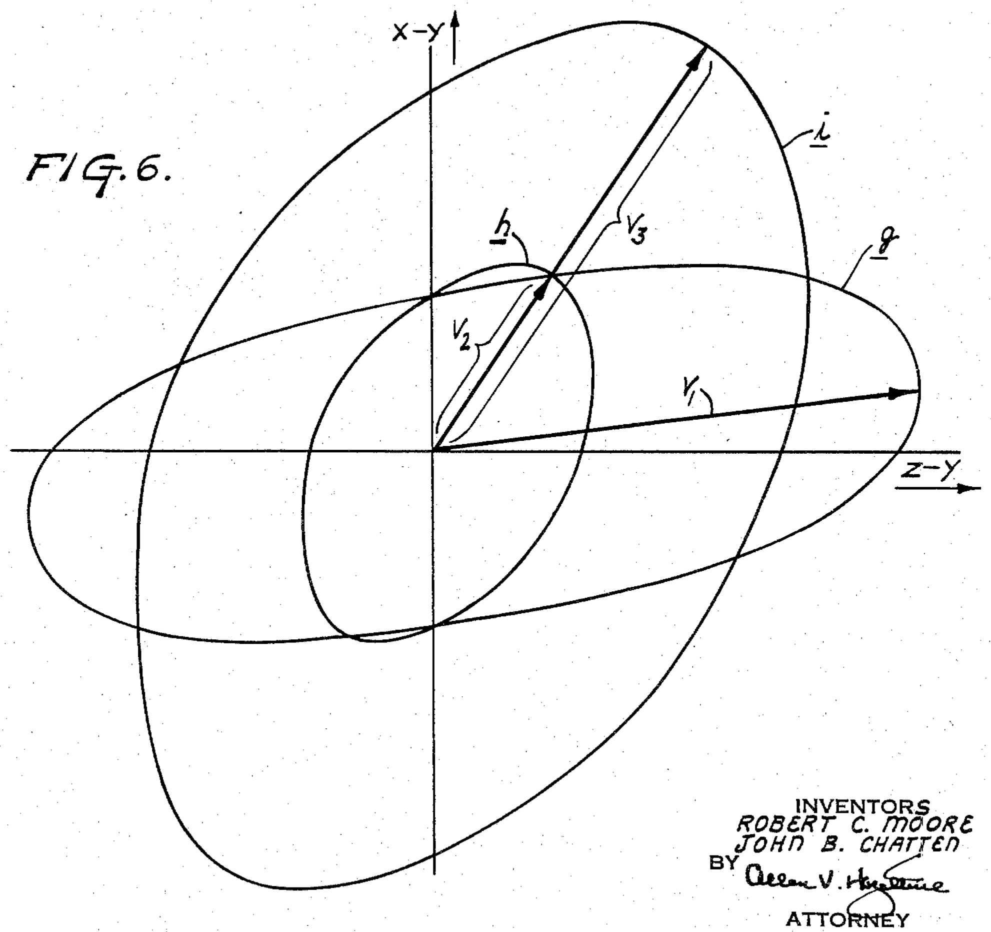

Figure 5 is a graphical representation indicating certain demand characteristics of the class of color television systems described herein, and which is useful in illustrating considerations relating to the compatability of such systems; and Figure 6 is a bidimensional graph representing the demand characteristics which obtain with several different adjustments of the system in accordance with the invention.

Figure 1:
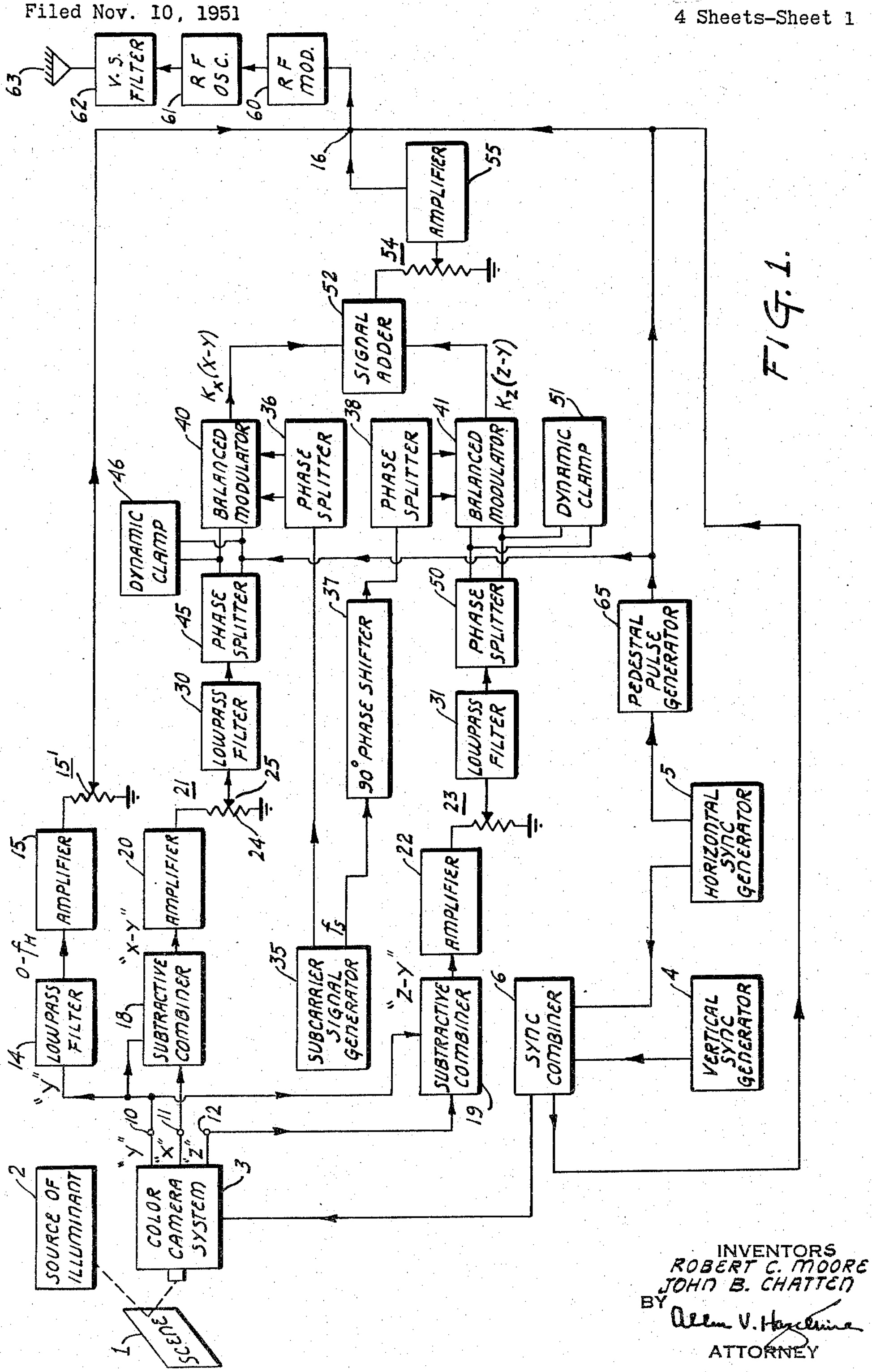
Figure 1 is a block diagram of a color television transmitter embodying the invention.

Referring more particularly to the specific embodiment of the invention represented in Figure 1, the transmitter there shown is of the general class described in the above-cited copending application of Bingley, and certain of the various elements are described in further detail in the copending application Ser. No. 236,585 of David B. Smith for "Electrical System," filed July 13, 1951, now Pat. No. 2,716,151, granted August 23, 1955, and in the copending application Ser. No. 245,806 of David B. Smith for "Television Receiving Systems," filed September 10, 1951. For this reason the nature of the transmitter need not be described here in great detail.

In this general class of transmitter, a color image of the scene to be televised is formed and scanned, preferably at the standard television scanning rates. The successively-scanned elements of the image are analyzed, as to their color content, into signals having amplitudes representative of the Y, $X-Y$, and $Z-Y$ values of the colors. Here, the symbols, X, Y and Z represent the values required of the X, Y and Z imaginary primaries commonly employed for color specification, in order that the color to be represented may be matched. The nature of these primaries has been defined completely by the International Commission on Illumination, and the designation of colors by specification of their X, Y and Z values is a well-known procedure.

The Y signal then contains complete information as to the brightness of the colors scanned, while the $X-Y$ and $Z-Y$ signals have amplitudes representative of the departures of the X and Z values of the colors from the X and Z values which they possess on white, respectively. The Y signal is transmitted in a manner similar to that employed in conventional black-and-white transmitters, preferably being limited to a frequency band having a predetermined upper frequency limit. The $X-Y$ and $Z-Y$ signals are utilized to effect balanced amplitude-modulation of separate subcarrier signals, which subcarrier signals are then combined to produce a resultant subcarrier signal which, in turn, is combined with the Y signal and transmitted therewith to the receivers.

In Figure 1, the scene to be televised is represented generally at 1, and is illuminated by an appropriate standard illuminant from the source represented generally at 2. Light from the scene is then focused in color camera system 3 to produce a color image which is scanned by means of any suitable scanning arrangement controlled by signals generated in vertical sync generator 4, horizontal sync generator 5, and supplied to the color camera system through sync combiner 6, all of which elements may be of conventional form. Color camera system 3 also includes suitable color analyzing means for producing three output signals at output terminals 10, 11 and 12 which are proportional to the Y, X and Z values of the successively-scanned color image elements, respectively. This image analysis may be performed by means of optical filters so chosen as to provide the complete camera system with transmissivity-versus-wave-length characteristics of the form of the well-known mixture curves, or distribution coefficients, of the X, Y and Z primaries. Alternatively, other optical filtering means may be employed in conjunction with electrical matrixing and synthesizing networks for producing the required X, Y and Z signals.

The Y signal thus formed may then be passed through low-pass filter 14, having an upper frequency cutoff $f_H$ which may be of the order of three megacycles per second, hereinafter abbreviated (mc.). This band-limited Y signal may then be passed through amplifier 15 and gain-controlling device 15' to video output terminal 16, for subsequent application to the radio-frequency section of the transmitter. Gain-controlling device 15' may suitably comprise a simple voltage-dividing potentiometer arrangement, for example.

The Y signal from camera terminal 10 is also supplied to one input terminal of subtractive combiner 18, the other input terminal of which is supplied with the X signal from terminal 11 of color camera system 3. Subtractive combiner 18 is operative to produce at its output terminals a signal proportional to the difference in the X and Y values of the image elements scanned. Thus, the output signal of subtractive combiner 18 comprises an $X-Y$ signal having an amplitude which varies in proportion to the $X-Y$ value of the image. This combiner may comprise a phase inverter to which the Y signals are supplied, together with conventional adding means for supplying the phase-inverted Y signal and the X signal to a common impedance, across which the desired difference signal $X-Y$ then appears. Alternatively, subtractive combiner 18 may comprise a conventional differential amplifier arranged to perform a similar function.

The Y signal from output terminal 10 of color camera system 3 is also supplied to one input terminal of subtractive combiner 19, the other input terminal of which combiner is supplied with the Z signal from output terminal 12. Subtractive combiner 19 may be substantially identical with subtractive combiner 18, and is operative to produce at its output terminal a signal whose amplitude varies in proportion to the difference $Z-Y$ between the Z and Y values of the successively-scanned image elements.

The $X-Y$ signal from subtractive combiner 18 is then supplied to signal amplifier 20 and gain-controlling device 21, while the $Z-Y$ signal from subtractive combiner 19 is supplied to signal amplifier 22 and gain-controlling device 23. Gain-controlling device 21 may, in the present embodiment, comprise a simple potentiometer arrangement comprising a resistive element 24 and a positionally-adjustable tap 25. Gain-controlling device 23 may be of substantially identical form. By a suitable choice of the gains of amplifiers 20 and 22, and appropriate adjustment of the gain-controlling devices 21 and 23, the proportionality factor relating the $X-Y$ and $Z-Y$ signals to the $X-Y$ and $Z-Y$ values of the color represented, may be adjusted in the particular manner specified in detail hereinafter.

The $X-Y$ signal from gain-controlling device 21 is then preferably passed through low-pass filter 30, which may limit the $X-Y$ signal to a relatively narrow frequency band ($0-f_C$), where $f_C$ may equal 0.6 mc., for example. Due to the relative inability of the eye to discern fine detail conveyed by differences in chromaticity of colors, when unaccompanied by brightness changes, a relatively narrow bandwidth for the chroma-representing signals is adequate. The $Z-Y$ signal from gain-controlling device 23 is also preferably supplied to a low-pass filter 31, which may have the same high-frequency cutoff $f_C$ as does low-pass filter 30, namely 0.6 mc.

The separate $X-Y$ and $Z-Y$ signals from filters 30 and 31, respectively, are then utilized to effect balanced amplitude-modulation of separate subcarriers of the same frequency $f_S$ but of phases which differ by substantially 90°. This amplitude-modulation is of a type which effects multiplication of the subcarrier signal and the modulating signal. Thus, the respective output signals of the two balanced modulators may be represented by the expressions $A(X-Y) \cos 2\pi f_S t$, and $B(Z-Y) \cos (2\pi f_S t+\pi/2)$, respectively, where A nad B are constants and $t$ represents time.

The source of subcarrier signal is subcarrier signal generator 35, which may be a conventional oscillator, preferably of good frequency stability, which supplies a sinusoidal oscillation directly to phase splitter 36, but through a 90° phase-shifter 37 to phase splitter 38. Phase shifter 37 may be a conventional resistance-capacitance network appropriately designed to provide the required 90° phase shift at the subcarrier frequency $f_S$. Phase splitters 36 and 38 are each adapted to produce a pair of output signals, one of which is in phase with the signal applied thereto and the other of which is in the opposite phase. Thus, the phase splitters here employed may suitably each comprise a vacuum tube amplifier stage having equal plate and cathode loads, one output signal being derived from the plate and one from the cathode of the vacuum tube employed. The two output signals of phase splitter 36 are then supplied to balanced modulator 40, while the two output signals of phase splitter 38 are supplied to balanced modulator 41.

By way of example, balanced modulator 40 may comprise a pair of pentagrid vacuum tubes having their cathodes grounded through a common resistor, their suppressor grids connected to their cathodes, their second and fourth grids supplied with positive potential from a suitable source, and their plates supplied with positive potential through a common plate load circuit. The first control grids of this pair of tubes may then be supplied with a pushpull, continuous-wave, subcarrier signal from phase splitter 36. Due to the balanced arrangement of the two vacuum tubes thus employed, the effects of the pushpull subcarrier signals upon the current through the common plate load impedance are substantially equal and opposite, and therefore cancel to produce zero subcarrier signal in the absence of other, externally-applied control signals. However, in addition, the third grids of each of the pair of tubes comprising the balanced modulator are also supplied with different, oppositely-phased halves of a push-pull version of the $X-Y$ signal, derived from the output of low-pass filter 30 by way of conventional phase splitter 45.

When the image being televised is white, the push-pull $X-Y$ signal is zero, and the above-mentioned cancellation of subcarrier signals in balanced modulator 40 continues unaffected. Therefore, no output is produced from balanced modulator 40 when white subject matter is scanned. However, when the color of the image departs from white, the X value of the color departs from equality with the Y value thereof, the pushpull $(X-Y)$ signal unbalances the modulator 40, and an oscillatory signal having an amplitude proportional to the value of the applied $X-Y$ signal is produced in the output of the balanced modulator.

Since the $(X-Y)$ signals are applied to balanced modulator 40 in pushpull, they tend to cancel each other in the modulator load circuit. However, in an actual embodiment of the invention, it will sometimes be desirable to include a filter having a passband $(f_S \pm f_C)$, at the modulator output terminals, to reject any residual $(X-Y)$ signals or higher harmonic components which may tend to appear in the modulator output signal.

Across the two input terminals of balanced modulator 40, there is also preferably connected a dynamic clamp 46. This device is employed so as to maintain the $X-Y$ signal values representative of the blanking level at a substantially constant value despite variations in either sense in the average values of these difference signals. Since the difference signal $X-Y$ may depart from zero in either sense depending upon the chromaticity of the scene, ordinary clamping or leveling devices which tend to eliminate all signals on one side of the blanking level are inappropriate here. The dynamic clamps here employed constitute, in effect, gated clamping devices which are rendered operative only during the horizontal blanking intervals to clamp the difference signal at a predetermined reference value at such times. Arrangements of this type are well known in the art, and are described in detail in U. S. Patent No. 2,299,945 of K. R. Wendt for a "Direct Current Reinserting Circuit," for example.

Balanced modulator 41 may be substantially identical with balanced modulator 40, and is supplied with a pushpull version of the $Z-Y$ signal from low-pass filter 31, by way of conventional phase splitter 50. A dynamic clamp 51, which may be similar to dynamic clamp 46 in structure and purpose, is preferably employed across the two input terminals of balanced modulator 41 which are supplied with the pushpull $Z-Y$ signals.

The output signals of the balanced modulators 40 and 41, which occur whenever image regions possessing chroma are scanned, are then combined by means of a conventional signal adder 52. The output of adder 52 therefore comprises a resultant subcarrier signal representative of the chroma of the successively-scanned elements of the color image, which signal has zero value when the image elements are white. The phase of this resultant subcarrier signal is determined by the relative amplitudes of the two separate subcarrier signals, and therefore by the hue of the scene. The amplitude of the resultant subcarrier depends upon the vector sum of the amplitudes of the two quadrature-related separate subcarrier signals, and hence upon the absolute amplitudes of the separate subcarriers, which in turn depend upon the saturation of the color represented.

The frequency $f_S$ of the subcarrier signal is preferably chosen so as to be an odd integral multiple of one-half the horizontal line scanning frequency, so as to achieve optimum compatibility in a standard monochrome receiver, as set forth hereinbefore. Further, in order to avoid the generation of spurious interfering signals in the receiver, the subcarrier frequency is preferably so chosen as to lie sufficiently above the upper frequency limit $f_H$ of the Y signal so that the lower sideband components of the subcarrier signal produced by the amplitude-modulation thereof do not extend to any substantial extent into the region occupied by the Y signal. Thus, $f_S$ may equal $(f_H+f_C)$ where $f_C$ is the upper frequency limit of the $Z-Y$ and $X-Y$ signals.

The output signal of adder 52, comprising the resultant chroma subcarrier, is then supplied through gain-controlling device 54 and amplifier 55 to video output terminal 16, where it is combined with the Y signal previously described. Gain-controlling device 54 may again be a simple potentiometer arrangement, and amplifier 55 may be of any suitable form adapted to pass the frequency band of the amplitude-modulated resultant subcarrier signal. By appropriate adjustment of gain-controlling devices 15' and 54, any desired ratio may be obtained between the maximum value of the Y signal and the maximum value of the resultant subcarrier signal at video output terminal 16.

The composite signal at terminal 16, comprising a low-frequency portion in the range $(0–f_H)$ representative of variations in the Y value of the successively scanned elements of the color image, and a higher-frequency portion extending from $f_H$ to $(f_S+f_C)$ representing variations in the $X-Y$ and $Z-Y$ values of the image elements, is then supplied to R.-F. modulator 60, which is operative to produce amplitude modulation of carrier waves generated by radio-frequency oscillator 61. The amplitude-modulated radio-frequency signal thus formed may then be supplied through vestigial sideband filter 62 and transmitting antenna 63 for radiation into space. The modulator 60, oscillator 61, filter 62 and antenna 63 may be designed in accordance with principles well known in the monochrome television art.

In order to facilitate separation and detection of the $X-Y$ and $Z-Y$ signals at the receiver, it is also preferable to provide at the transmitter a color synchronizing signal, which is transmitted along with the color-representing signals described above. This may be done by employing a pedestal pulse generator 65 adapted to produce a voltage pulse during each "back porch" interval, which is the portion of the blanking period immediately following each horizontal sync pulse. Accordingly, pedestal pulse generator 65 may appropriately be supplied with timing pulses from horizontal synchronizing signal source 5. Pedestal pulses from generator 65 may be then supplied to one of the $X-Y$ signal input terminals of balanced modulator 40. The pedestal pulse then operates to unbalance the modulator 40 during the "back porch" intervals, with the result that subcarrier signal having the same phase as the $X-Y$ subcarrier component is generated during the pedestal pulse. The resultant burst of subcarrier signal passes through adder 52, gain-controlling device 54, and amplifier 55 to video output terminal 16, and thence is transmitted along with the Y signal. Pedestal pulses are also supplied directly to terminal 16 in appropriate amplitude and polarity to prevent the subcarrier synchronizing burst from penetrating the region of the television signal amplitude range usually reserved for image-representing signals.

Also supplied to terminal 16 are the combined horizontal and vertical synchronizing signals from sync combiner 6. These conventional deflection-synchronizing signals are transmitted along with the color burst, the Y signal, and the resultant-subcarrier signal representing image chroma.

In accordance with the present invention, the arrangement of the portion of the transmitter utilized to derive the resultant subcarrier signal is such that the constant of proportionality $K_X$ which relates the magnitude of the variations in the subcarrier signal formed by balanced modulator 40, to the $X-Y$ values of the scanned color-image regions, is substantially greater than the proportionality factor $K_Z$, relating the variations produced in the subcarrier signal from modulator 41 to the corresponding $Z-Y$ values of these same color regions. The subcarrier ratio R, which will be employed hereinafter to designate the ratio $$\frac{K_X}{K_Z}$$

is preferably substantially equal to the ratio of the maximum sensitivity of the average human eye for changes in only the X values of colors of any specified brightness, to the maximum sensitivity of the average human eye for changes in only the Z values of colors of this same brightness.

This value of subcarrier ratio R is obtained in the present embodiment by employing substantially identical arrangements and adjustments of the separate $X-Y$ and $Z-Y$ signal channels in the transmitter, except that gain-controlling device 21 is adjusted to provide a value of gain which exceeds the gain provided by gain-controlling device 23, by a factor equal to the ratio R. However, the desired subcarrier ratio R may alternatively be obtained by any of a variety of combinations of adjustment. The amplitude variations produced in the separate subcarrier signals by the $X-Y$ and $Z-Y$ signals depend upon the magnitudes of the original signals from the camera system 3, the gains associated with the subtractive combiners 18 and 19, amplifiers 20 and 22, phase-splitters 36 and 38 and modulators 40 and 41, as well as upon the adjustments of gain-controlling devices 21 and 23. Furthermore, the magnitude of subcarrier modulation may also depend in part upon the magnitudes of the subcarrier signals supplied to the modulators and upon the nature of the circuit arrangement by which the subcarrier signals and the $X-Y$ and $Z-Y$ signals are mixed to produce the desired modulation. The important condition to be met is that relating the proportionality factors $K_X$ and $K_Y$ at the transmitting antenna, and the differences between the $X-Y$ and $Z-Y$ channels by which this condition is obtained may, in general, occur in respect of any of the separate channel elements. Thus, the ratio R between the two proportionality factors $K_X$ and $K_Y$ may be obtained by providing differences in the gains of any or all of the channel elements from camera system 3 to antenna 63, including the balanced modulators and the circuits by means of which they are supplied with subcarrier signals. It is also possible to modify the ratio R of subcarrier components after they have been combined, by adding to the resultant subcarrier signal a suitably-phased quantity of either or both of the separate subcarrier components.

The transmissions of the color television transmitter described above may be received by a standard monochrome television receiver, the Y signal in the frequency range $(0–f_H)$ producing brightness variations in the reproduced image which result in the formation of a highly satisfactory monochrome version of the color image. Since the Y signal is proportional to the true brightness of the color image, the monochrome version of the image is truly panchromatic, resulting in a superior reproduced image. In addition, the chroma subcarrier signal is received by standard, wide-band monochrome receivers when the subject matter of the televised scene possesses chroma. Under these conditions, the chroma subcarrier tends to produce modulation of the brightness of the monochroma image, but, due to the choice of the subcarrier frequency as an odd integral multiple of one-half the horizontal line scanning frequency, the phase of the subcarrier signal is opposite during immediately successive television frames, and its effects are averaged to a substantial degree due to the persistence of the cathode-ray tube screen phosphors, and of the human eye. However, this cancellation is usually not perfect, and a residual dot pattern may exist when transmitting certain colors. The visibility of this pattern increases in proportion to the magnitude of the resultant subcarrier signal transmitted by the color television transmitter. The compatibility of the color system with presently-existing standard receivers in substantially unmodified form should be such that interference produced by the subcarrier signal, when at its maximum value, is still not prohibitively objectionable. It is particularly in this respect that the presently proposed system permits improvements in the compatibility attainable, as will become apparent hereinafter.

Figure 2:
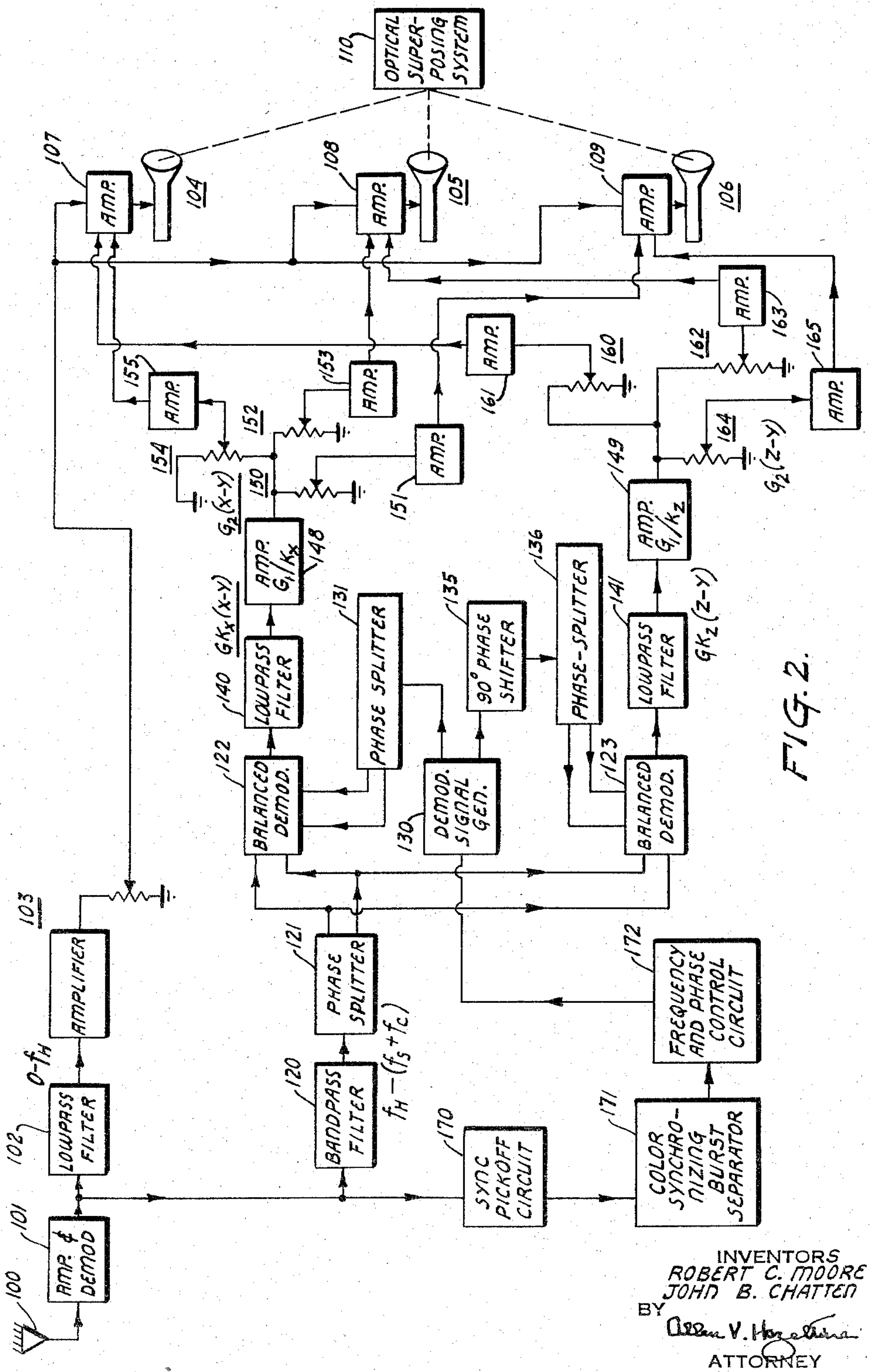
Figure 2 is a block diagram of a color television receiver for producing a color image from the transmissions of the transmitter of Figure 1.

Referring now to Figure 2, the color television receiver there illustrated is adapted to receive the transmissions of the transmitter represented in Figure 1, and to derive therefrom a satisfactory color image corresponding to that scanned at the transmitter.

Thus, antenna 100 is adapted to intercept the color transmissions from transmitting antenna 63, and to supply them to amplifier and demodulator 101, wherein they may be amplified to a suitable level, and detected by conventional means to produce a video signal corresponding to that existing at video output terminal 16 of the transmitter, except for the possible presence of substantial amounts of electrical noise introduced at points situated prior to the amplifier and demodulator output terminals.

The video signals at the output terminal of amplifier and demodulator 101 are then supplied to low-pass filter 102, preferably having an upper frequency cutoff at frequency $f_H$, which may be three megacycles in the case exemplified. The output of filter 102 then comprises the Y signal representative of image brightness, and may be supplied to the image-reproducing portion of the receiver through gain-controlling device 103, comprising a suitable amplifier and associated gain control. Although in some instances the image-reproducing apparatus may comprise a single, specially-constructed cathode-ray tube, in the present embodiment of the invention there are employed three separate cathode-ray tubes 104, 105, and 106, which are responsive to impingement by the cathode-ray beams thereof to produce light principally in the red, blue and green portions of the visible spectrum respectively.

The separated Y signal may be applied to cathode-ray tubes 104, 105 and 106 through amplifiers 107, 108 and 109 respectively, the gains of these amplifiers and the characteristics of the corresponding cathode-ray tubes preferably being such that the combined light emissions of the tubes appear white to the human eye when controlled only by the Y signals from gain-controlling device 103. The red, blue and green primary-color images formed on the screens of tubes 104, 105 and 106 respectively, are optically superposed by means of optical superposing system 110, which may conveniently comprise a suitable arrangement of dichroic mirrors and lenses arranged in accordance with principles well known in the art.

The effect of the Y signal is to produce, in the optical superposing system 110, an achromatic version of the color image comprising variations truly representative of the brightness of the televised scene, and characterized by a definition corresponding to a three megacycle frequency bandwidth.

The chroma subcarrier signal present in the video signal at the output of amplifier and demodulator 101, is selected by bandpass filter 120, which may have a passband extending from frequency $f_H$ to $(f_S+f_C)$, which is the frequency band of the resultant subcarrier signal. The output signal of filter 120 then is substantially identical in form with that supplied to video output terminal 16 from amplifier 55 in the transmitter of Figure 1, with the exception that there will generally be present an appreciable amount of electrical noise, usually introduced into the signal channel in the preceding amplifying stages or in the space-link between transmitter and receiver.

The separated resultant subcarrier signal is then supplied to a circuit arrangement for deriving separate signals proportional to the $X-Y$ and $Z-Y$ values of the successively-scanned regions of the color image. This circuit arrangement may comprise, in the present instance, a phase splitter 121, which may be of the conventional type described hereinbefore, for supplying pushpull versions of the resultant subcarrier signal to each of the balanced demodulators 122 and 123.

Balanced demodulator 122 is also suplied with a locally-generated demodulation signal having a frequency and phase substantially identical with that component of the received subcarrier signal which is modulated by the $X-Y$ signals. Thus there may be employed a demodulation signal generator 130, which may be adapted to produce oscillations of the same frequency as the subcarrier signal $f_S$, which oscillations are then supplied through phase splitter 131 to balanced demodulator 122. Balanced demodulator 122 may be similar to balanced modulator 40 in the transmitter. Because of the above-described correspondence between the phase and frequency of the demodulation signal and that component of the received subcarrier signal due to the separate subcarrier signal from balanced modulator 40 of the transmitter, the output signal of balanced demodulator 122 contains a low-frequency component comprising amplitude variations corresponding to the $X-Y$ signal at the transmitter. Since the component of the received subcarrier signal due to the $Z-Y$ signal at the transmitter is in phase quadrature with the demodulation signal applied to demodulator 122, the $Z-Y$ signal has no substantial effect upon the output signal of demodulator 122.

Oscillations from demodulation signal generator 130 are also supplied through 90° phase shifter 135 and phase splitter 136 to balanced demodulator 123, which may be substantially identical with balanced demodulator 122. Since the demodulation signal supplied to balanced demodulator 123 is in phase with that subcarrier component which is modulated by the $Z-Y$ signals, the output of demodulator 123 contains a signal varying in proportion to the $Z-Y$ signal, with no substantial contamination by the quadrature-related $X-Y$ signal.

The separated $X-Y$ signal, and the separated $Z-Y$ signal, are supplied to low-pass filters 140 and 141 respectively, which filters preferably possess high frequency cut-offs situated just above the upper frequency limit $f_C$ of the $X-Y$ and $Z-Y$ signals, thereby rejecting higher frequency undesired signals such as the locally-generated demodulation signal.

The output signal of low-pass filter 140 therefore comprises substantially only the $X-Y$ signal in the frequency range 0 to 0.6 megacycle, this signal being related to the $X-Y$ component of the resultant subcarrier signal, by another proportionality factor G. The signal from filter 140 may therefore be represented by the expression $GK_X(X-Y)$. Since the channels for the $X-Y$ and $Z-Y$ signals in the receiver are preferably substantially identical up to this point, the $Z-Y$ signal produced at the output of low-pass filter 141 is related by the same proportionality factor G to the $Z-Y$ component of the resultant subcarrier produced at the transmitter, and therefore may be represented by the expression $GK_Z(Z-Y)$. The proportionality factor relating the $X-Y$ signal at the output of filter 140 to the $X-Y$ values of the color image regions scanned at the transmitter, is therefore related to the proportionality factor relating the $Z-Y$ signals from filter 141 to the $Z-Y$ values of the televised image, in the same ratio $R=K_X/K_Y$ as was defined with regard to the transmitter signals.

The separated $X-Y$ and $Z-Y$ signals from filters 140 and 141 respectively are then supplied to the three cathode-ray tubes 104, 105 and 106 through an electrical matrix network, the function of which is to derive from the $X-Y$ and $Z-Y$ signals, appropriate signals for controlling the intensities of the three primary-color-producing tubes to add the proper chromaticity to the final combined image. Methods for calculating the signal voltages which should be applied to control the intensities of the three real primary-colors produced by the three cathode-ray tubes of the receiver, in terms of the $X-Y$ and $Z-Y$ values of the colors to be represented, are known in the art and need not be set forth here in detail. Typical parameters of appropriate matrixing networks are given, for example, in the above-cited copending application Ser. No. 236,585 of David B. Smith wherein there are indicated the amounts and polarities of the $X-Y$ and $Z-Y$ signals which may be supplied to each of the three cathode-ray tubes in a typical embodiment.

However, it should be recognized that although the $X-Y$ and $Z-Y$ signals from filters 140 and 141 are each proportional to the corresponding values of the colors of the televised scene, the proportionality factor for the $X-Y$ signals is R times greater than the proportionality factor for the $Z-Y$ signals. Accordingly, in the present embodiment the gain provided for the $Z-Y$ signals supplied to the three receiver cathode ray tubes is made R times greater than in a system not employing the present invention. Therefore, the $X-Y$ and $Z-Y$ signals from filters 140 and 141 are supplied to amplifiers 148 and 149 respectively, the respective gains of which are in the ratio of $K_Z$ to $K_X$, or $1/R$.

However, it will be appreciated that separate amplifiers need not be provided for this specific purpose, and that the required ration $1/R$ between the gains provided to the $X-Y$ and $Z-Y$ signal in the receiver may be obtained by appropriate adjustment of any or all of the elements of the receiver through which the $X-Y$ and $Z-Y$ signals are supplied to the image-reproducing apparatus, or in the latter apparatus itself. For example, in some instances the desired difference in gain may be obtained by modifying the relative magnitudes of the two subcarrier components before their separation. This may be accomplished by means of the arrangement described in detail in the copending application Serial No. 323,234 of Stephen W. Moulton and James S. Bryan, filed November 29, 1952, for a "Carrier Wave Modifying System," now Pat. No. 2,798,201, granted July 2, 1957. Further, since it is the strength of the light emission from the image-reproducing means which is ultimately to be controlled by the $X-Y$ and $Z-Y$ signals, the required difference in overall gain of the entire receiver, including the light-emissive portion thereof, may be partly or entirely provided by appropriate modification of the sensitivity of the light-emitting devices, rather than of the voltages controlling their light emission. For example, the nature of the phosphor materials employed in the cathode-ray tube screen structures may be modified to change their relative efficiencies, thus changing the quantity of light emitted in response to unit changes in applied voltages. These latter methods are of particular value in applications of the invention to color television systems of the class wherein the received subcarrier signal is applied to a single phosphor-striped cathode-ray tube without separation of the $X-Y$ and $Z-Y$ signals, such as the system described in detail in Patent No. 2,667,534 of Edgar M. Creamer, Jr. and Melvin E. Partin, issued January 26, 1954, for an "Electrical System."

The matrix network of Figure 2 may include gain-controlling device 150 and amplifier 151 for supplying the $X-Y$ signal from amplifier 148 to green cathode-ray tube 106 by way of amplifier 109, gain-controlling device 152 and amplifier 153 for supplying the $X-Y$ signal to blue cathode-ray tube 105 by way of amplifier 108, and gain-controlling device 154 and amplifier 155 for supplying the $X-Y$ signal in appropriate proportions to red cathode-ray tube 104 by way of amplifier 107.

Similarly, the $Z-Y$ signals from amplifier 149 are supplied to cathode-ray tube 104 by way of gain-controlling device 160 and amplifier 161, to green cathode-ray tube 105 by way of gain-controlling device 162 and amplifier 163 and to blue cathode-ray tube 106 by way of gain-controlling device 164 and amplifier 165.

It will be understood that the gains of the matrixing network may be adjusted by variation of the gain-controlling devices and by suitable choice of the gains of the amplifiers included therein, while the proper polarities of the signals may be obtained by utilizing an appropriate number of phase-reversing amplifying stages in the amplifiers, an odd number of stages ordinarily producing a phase reversal of signal.

To maintain the demodulation signal generator 130 at the proper frequency and phase, the received signal from amplifier demodulator 101 is preferably also supplied to sync pickoff circuit 170, which is operative to select from the composite video signal the horizontal synchronizing pulses and the color synchronizing bursts. The latter signals may then be supplied to color-synchronizing burst separator 171, which may comprise a high Q filter, such as a crystal filter, resonating at or near the frequency of the subcarrier. The synchronizing signal thus separated may be supplied to frequency and phase control circuit 172, the output of which is connected to demodulation signal generator 130 to control the frequency and phase of the demodulation signal. Although any of various forms of conventional automatic-frequency-control circuits may be employed for this purpose, in some instances it will be desirable to employ a combination of frequency and phase control as described in detail in the copending application No. 197,551 of J. C. Tellier for "Signal Control Circuits," filed November 25, 1950, now Pat. No. 2,740,046, granted March 27, 1956.

It is understood that conventional circuits (not shown) for producing properly-synchronized deflection of the beams of cathode-ray tubes 104, 105 and 106 are also employed.

The theory of operation of the invention will be more fully appreciated in view of the following colorimetric and systemic considerations. To specify the hue, saturation and brightness of a color, three specifying values are necessary. Conventionally, specification may be accomplished in terms of the X, Y and Z values of the colors, where X, Y and Z correspond to the amounts of the imaginary primaries specified by the International Commission on Illumination (ICI), which are necessary to accomplish a match with the color to be specified. A convenient geometric model for representing these specifications is obtained by plotting the X, Y and Z values of colors along the mutually orthogonal axes of a three-dimensional graph. Thus, referring to Figure 3, any color $C_C$, having the specifications $X_C$, $Y_C$, $Z_C$, may be represented by a vector having its origin at the coordinate origin and its termius at a point P in the first octant of the space defined by the X, Y and Z axes, the position of this point being such that its distance from the YZ plane equals $X_C$, while $Y_C$ and $Z_C$ are represented by the distances of point P from the XZ and XY planes respectively. The resultants of various combinations of colors may then be found by conventional vector addition and subtraction of the vectors representing the separate colors.

The class of system represented in Figures 1 and 2 operates generally in the following manner. A signal proportional to the Y value of the colors of successively-scanned regions of the televised image is derived at the transmitter, transmitted to the receiver, and utilized to control the brightness of a black-and-white image therein. This is permissible because the magnitude of the white vector having the same brightness as that of the color to be reproduced, is in a constant ratio to the Y value of that color, the white vector being one lying along a line equidistant from the three orthogonal axes. Thus, referring to Figure 3, the $Y_C$ plane indicated therein as passing through the point P and extending parallel to the ZX plane, is uniquely defined by its intercept with the Y axis, but is equally well defined by the length of the white vector extending from the origin O to the white point $W_2$ in the Y plane. By applying the Y signal to the image-reproducing section of the receiver in appropriate proporitons, a white point such as $W_2$, lying in the brightness plane of the color represented, is produced in the receiver for each color to be reproduced.

The subtractive combiners utilized in the transmitter then form signals proportional to the X and Z displacements of the color point P from the white point $W_2$ of identical brightness. These values are represented by the vectors $Z-Y$ and $X-Y$ in Figure 3. Obviously, the sum of the white vector, the $Z-Y$ vector and the $X-Y$ vector is the desired color vector $C_C$.

It will therefore be appreciated that the system operates in such manner that the $X-Y$ signal represents the X displacement of the color point represented, from the white point of equal brightness, while the $Z-Y$ signal represents the displacement of the color point in the Z direction from the white point.

Figure 3:
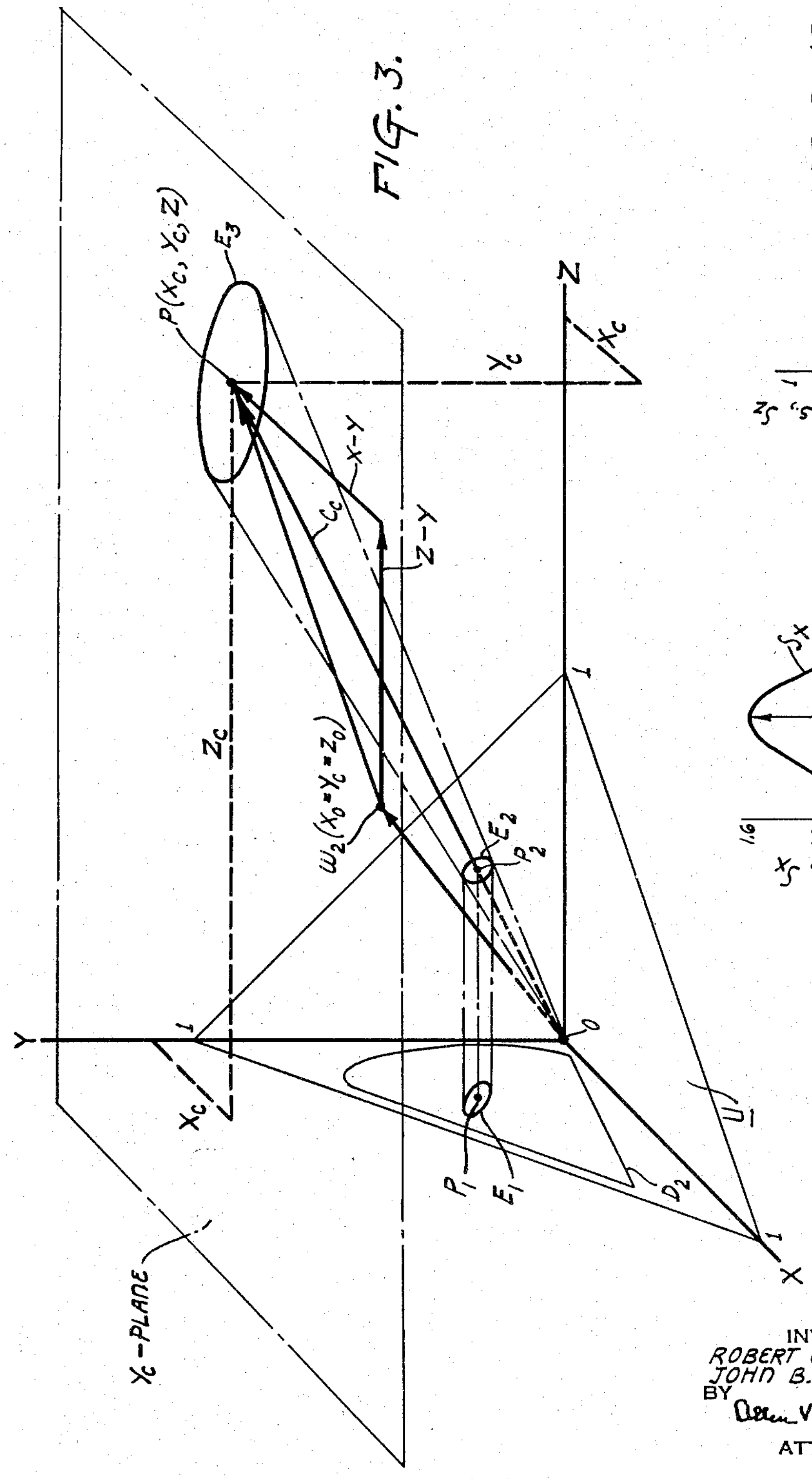
Figure 3 is a tri-dimensional graphical representation which is useful in explaining the colorimetric theory upon which is based the operation of the class of color television system represented in Figures 1 and 2.

Also shown in Figure 3 is the unit plane U, which passes through the coordinate axes at the points, 1, 1, 1. This plane represents the locus of points for which the sum of the X, Y and Z values of colors equals unity. The point at which any color vector intersects the unity plane therefore defines the chromaticity of that color. Thus, vector $C_C$ intersects the unity plane at point $P_2$, the position of which point represents the chromaticity of the color $C_C$. A projection of this point in the unity plane onto the XY plane, in a direction parallel to the Z axis, produces a corresponding point $P_1$ in the conventional bidimensional chromaticity diagram $D_2$ in the XY plane.

Now the $X-Y$ and $Z-Y$ signals supplied to the balanced demodulators in the color receiver are generally accompanied by interfering noise signals, which may be introduced in the space link between transmitter and receiver, or may arise within the receiver itself. The effect of these noise signals is to modify substantially equally the $X-Y$ and $Z-Y$ values of the colors reproduced at the receiver. In a system not employing the invention, and utilizing equal gains for the $X-Y$ and $Z-Y$ signals in the receiver, such noise produces a circle of confusion in the Y plane about the point P having the X and Z values of the color to be reproduced. However, due to differences in the sensitivity of the human eye to chromaticity changes in the X and Z directions respectively, such a circle of confusion does not produce a subjective impression of equal chromaticity change for all directions of change, as will be more apparent from the following.

Referring to Figure 3, $P_1$ represents a color point on a conventional chromaticity diagram, corresponding to point P in the plane $Y_C$. Point $P_1$, when projected parallel to the Z axis, intercepts the unit plane U at point $P_2$, and $P_2$ may then be projected with respect to origin O to the point P in which it intercepts the $Y_C$ plane. About point $P_1$ there is represented an ellipse $E_1$, the points on which are displaced from color point $P_1$ by a distance proportional to the extent to which the chromaticity of point $P_1$ must be altered to produce the same degree of subjective perceptibility of chromaticity change. Thus, $E_1$ represents one ellipse of the type discussed by D. L. McAdam, at p. 247 et seq. of the 1942 issue of the "Journal of the Optical Society of America," for example. It will be apparent that the direction of the major axis of this ellipse is the direction of least sensitivity of the eye to chromaticity change, while the direction of the minor axis is indicative of the direction of maximum eye sensitivity to chromaticity changes. By projecting the color points falling on the ellipse $E_1$, in a direction parallel to the Z axis, ellipse $E_2$ is produced in the unit plane. The ellipse $E_2$ may then be projected upon the constant brightness plane $Y_C$, by means of lines drawn radially from origin O, to produce ellipse $E_3$. The latter ellipse then represents, by its distances from point P, the extent to which the chromaticity of point P may be altered to produce equal subjective impressions of chromaticity change, without any accompanying changes in color brightness.

Although the McAdam ellipse $E_1$ may have its axis oriented in any of a variety of ways depending upon the chromaticity of point $P_1$, the major axis of corresponding ellipse $E_3$ is substantially parallel to the Z axis, and the minor axis is substantailly parallel to the X axis. Accordingly, ellipse $E_3$ is representative of the fact that the average human eye is generally most sensitive to chromaticity changes resulting from variations in substantially only the X values of colors, and generally least sensitive for variations in substantially only the Z values of colors of the same brightness. Variations in the $X-Y$ signals, such as might be caused by noise interference, therefore generally produce greater apparent subjective variations in chromaticity than do variations of equal magnitude in the $Z-Y$ signals. It is apparent from the construction of Figure 3 that, if only the brightness of the color represented by point P is changed, corresponding ellipses having the same shape and ratio of minor-to-major axes as ellipse $E_3$, will be obtained in other brightness planes.

Although only one ellipse has been shown in Figure 3, it has been found that all real color points in a plane of constant brightness such as the $Y_C$ plane, are associated with eye-sensitivity ellipses having their axes substantially parallel to the Z and X axes. However, the lengths of the axes of these ellipses may differ substantially for different points in the same brightness plane. Since the major and minor axes of the ellipses are inversely related to the corresponding eye-sensitivities, the sensitivity of the average human eye to changes in the X and Z values of various colors of the same brightness may be represented graphically by plotting values which are the reciprocals of the major and minor axes of the ellipses in the corresponding brightness plane. This has been done in Figures 4A and 4B.

Figure 4B:
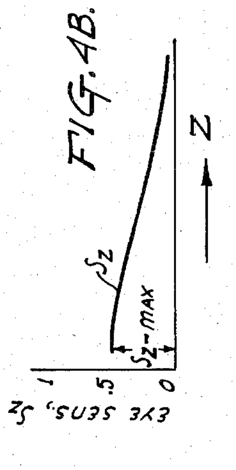
Figures 4A and 4B are graphs of the sensitivities of the average human eye to changes in only the X and Z values of colors, respectively, to which reference will be made in describing the theory underlying the improved arrangement of the present invention.
Figure 4A:
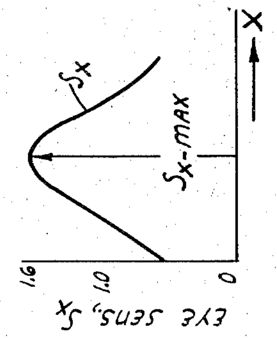

Referring to Figures 4A and 4B, the ordinates of curve $S_X$ in Figure 4A are proportional to the sensitivity of the average human eye to changes in substantially only the X values of colors, while the ordinates of curve $S_Z$ in Figure 4B are similarly proportional to the sensitivity of the average human eye to variations in substantially only the Z values of colors of the same brightness. The direction of increasing abscissae, for the curve $S_X$, corresponds generally to increases in the X values of the colors whose sensitivities are represented; it is unnecessary to indicate the values of $S_X$ for colors of various Z values, since $S_X$ is substantially invariant with respect to changes in the Z values of colors of the same brightness. With regard to the curve $S_Z$, increasing abscissae are generally indicative of increasing Z values of the colors whose eye sensitivities are represented, there being no substantial differences in the sensitivity of the eye to variations in Z value, for colors differing only as to their X values. The exact form and scale of coordinates of curves $S_X$ and $S_Z$ need be indicated only generally, since it is principally the existence and the value of their respective maxima which are especially pertinent here.

Accordingly, it will be appreciated that the curve $S_X$ covers substantially the full gamut of values of eye-sensitivity to X changes alone, and is characterized by a maximum value, $S_{X-MAX}$, which, on the arbitrary ordinate scale represented, is substantially equal to 1.6. Similarly, the greatest value of eye sensitivity attained for any real color of a given brightness, in response to variations in the Z values thereof only, is represented by $S_{Z-MAX}$, and, on the same scale as that of Figure 4A, is substantially equal to 0.5. From these curves, it will be appreciated that the greatest sensitivity of the human eye to variations in X values, for all colors of any predetermined brightness, is substantially three times greater than the greatest sensitivity of the human eye to variations in the Z values of colors of the same brightness.

Therefore, by increasing the amount of electrical noise which is effective to produce variations in the Z values of colors by a factor of three, substantial equalization between the subjective noise effects due to Z and X variations, respectively, is attained. This is accomplished in the inventive embodiment represented herein in detail by adjusting gain-controlling devices 21 and 23 in the transmitter so that the proportionality constant $K_X$ is approximately three times greater than $K_Z$ at a point in the system located anterior to the point of noise injection, and by adjusting the gains of amplifiers 148 and 149, situated in the receiver at a position following the point of noise injection, so that $X-Y$ and $Z-Y$ signals are regained which are related by the same proportionality constant to the $X-Y$ and $Z-Y$ values of colors represented, but which are accompanied by electrical noise in the ratio $K_Z/K_X$.

Advantage may be taken of this adjustment to improve considerably the compatibility of the system, with respect to the above-described reference system transmitting $(X-Y)$ and $(Z-Y)$ signals in equal proportions, by effecting a reduction in the maximum value of the resultant subcarrier signal, and therefore a reduction in the visibility of residual dot structure which may be produced in a standard black-and-white receiver in response to color transmissions generated during the representation of image regions possessing chroma. By then increasing the gain provided to the resultant subcarrier by a factor of about 2.5, the compatibility of the system will be substantially as before, but the subjective noise variations produced in the color image will be reduced by a factor of 2.5. The reasons for the advantages of these and other adjustments of a system operated in accordance with the invention, will be appreciated more fully from the following discussion of the demand characteristics of the system.

It is known that when an object is illuminated by a fixed amount and quality of illuminant, the apparent brightness which it presents to the human eye is greatest when its color is that of the illuminant and less for other colors. Thus, when an object is illuminated by a standard white source, for example, substantially all of the incident illumination is reflected toward the observer when the object is a pure white, and hence substantially all of the incident illumination is operative to produce brightness effects in the eye of the observer. However, when the object possesses chroma, it absorbs certain wavelengths of the incident radiation and reflects others, to varying degrees. The object is therefore characterized, for any portion thereof having the same color, by a reflectivity $r_\lambda$ which is a predetermined function of the wavelength of the incident light. Due to the fact that coloration of the object results only from selective absorption of various components of the illuminant, the reflected light presented to the eye of the observer is of less total energy than is the illuminant, and therefore produces less visual stimulation. Thus, denoting the energy of the illuminant for various wavelengths as $E_\lambda$, the reflected light is equal to the produce $E_\lambda r_\lambda$ of the incident illumination multiplied by the reflection characteristic of the object. The effectiveness of this reflected light in producing brightness stimulation of the eye, for packets of energy having wavelengths lying within an arbitrarily small range $d_\lambda$, is equal to the reflected light energy weighted by the visual response characteristic of the eye, which may be designated $\bar{y}$. The total brightness effect of the light from the object is therefore equal to the integral of $E_\lambda r_\lambda \bar{y} d_\lambda$. The visual efficiency of the color represented by $r_\lambda$ is the ratio of the brightness effect produced by the reflected light, to the brightness effect which would be obtained from a white object from which all of the illuminating energy was reflected to the eye. Accordingly, the visual efficiency may be expressed by the ratio:

$$\frac{E_\lambda r_\lambda \bar{y} d_\lambda}{E \bar{y} d_\lambda}$$

It is to be noted that the visual efficiency represents the brightness Y of the light from a reflecting object, for unit brightness of incident white illumination.

It has further been found that objects having colorations to the human eye which appear to be substantially identical, may possess any of a variety of reflection functions $r_\lambda$. However, the reflectance characteristics which give maximum visual efficiency have been determined, and the values of maximum visual efficiency have also been calculated. Accordingly, to each point on a conventional chromaticity diagram there may be assigned a value of maximum visual efficiency, characteristic of the corresponding color, and points of similar visual efficiencies may be connected by contour lines. These visual efficiencies represent the maximum brightnesses Y, of the colors of the illuminated objects, relative to the brightness of a perfectly reflecting white object.

Knowing the Y values of each color point in the ICI chromaticity diagram, the corresponding X and Z values may readily be calculated, by well known methods, from the trichromatic coefficients of the colors. These maximum values represent the maximum demands for the primaries X, Y and Z, in order that each color may be represented. Furthermore, one may readily calculate the $X—Y$ and $Z—Y$ maximum demands for each color, and then determine the $X—Y$ and $Z—Y$ maximum demands in terms of the maximum Y demand. Having found these relationships, the Y demands may then be plotted in a coordinate system having maximum $Z—Y$ demands as abscissae and maximum $X—Y$ demands as ordinates.

Thus, referring to Figure 5 the Y demand contours are plotted with maximum $Z-Y$ demand as abscissae and maximum $X-Y$ demand as ordinates, for several brightnesses of light reflected from objects illuminated with the standard white illuminant "C," the nature of which illuminant is well known in the art. The scale of coordinates here employed is such that unity corresponds to the Y value of light from a perfectly reflecting "white" object. Curves *a, b, c, d, e* and *f* correspond to Y values of reflected light of .1, .2, .4, .6, .8 and .95, respectively.

In a system of the class described hereinbefore, in which the magnitude of the resultant subcarrier signal is proportional to the vector sum of the $Z-Y$ and $X-Y$ signals in quadrature, if the $Z-Y$ and $X—Y$ signal variations are related by the same proportionality factor to the $Z-Y$ and $X-Y$ values of the color represented, respectively, then Figure 5 may be considered as representing the values of the resultant subcarrier signal produced. Under this condition, the subcarrier amplitude would be proportional to the length of the vector from the origin to any selected point on one of the curves, and the phase of the resultant subcarrier would be represented by the angle which that vector forms with the positive direction of the $X—Y$ coordinate axis. If there are drawn a greater number of closed curves such as those represented, all curves will be found to lie within the envelope curve $g$, which is substantially elliptical in form, and which has its major axis substantially parallel to the $Z-Y$ axis and its center substantially at the origin of coordinates. Under these conditions the vector $V_1$ represents the maximum amplitude of subcarrier signal necssary to represent any quality or quantity of light reflected from a scene illuminated by a predetermined white illuminant "C."

Referring now to Figure 6, the subcarrier constitution resulting from employment of the present invention is represented. Curve $g$ represents the same envelope curve shown in Figure 5, and is plotted on a graph in which the ordinates represent the relative $X-Y$ signal values and the abscissae represent relative $Z-Y$ signal values. In accordance with the invention, the portion of the transmitted signal representing the $Z-Y$ values of the signal comprises variations which are related to the $Z-Y$ values of the colors represented, by a proportionality constant $K_Z$ which is substantially one-third of the constant $K_X$ relating the $X-Y$ signal variations to the $X-Y$ color values. Accordingly, in the arrangement of the invention, the abscissae of all points of curve $g$ in Figure 6 are reduced by a factor of approximately three, and the locus of the maximum subcarrier amplitude for various phases is then more nearly a circle than was previously the case, as is represented by curve $h$. Whereas the maximum subcarrier amplitude was formerly represented by the vector $V_1$, it is now represented in the arrangement of the invention by the vector $V_2$, which is less than $V_1$ by a factor of approximately 2.5. The fact that this factor is 2.5 rather than 3 is ascribable to the fact that the major axis of the ellipse $g$ does not lie exactly parallel to the $Z-Y$ axis.

Ellipse $h$ therefore represents the condition obtained by utilizing the invention in such a way as to maintain the peak subjective noise variations produced in a color receiver substantially the same as in a system having equally proportioned $Z-Y$ and $X-Y$ signals, while improving the compatibility of the color transmissions as received by standard black-and-white receiver, by a factor of about 2.5. However, although the adjustment of the apparatus in accordance with the present invention will always produce an ellipse having the general shape of the curve $h$, the absolute size of this ellipse will depend upon the gain provided to the resultant subcarrier, and may be made greater or smaller in accordance with the particular objects of the designer. Thus, by increasing the resultant subcarrier signal gain at the transmitter by a factor of substantially 2.5, the locus of the maximum resultant subcarrier for various phase angles will be as represented by curve $i$, for which the maximum resultant subcarrier, as represented by vector $V_3$, is substantially identical in magnitude with that previously obtained as represented by vector $V_1$. Under these conditions, the compatibility of the system is not improved over that previously obtained, but, due to the increase in transmitter gain by a factor 2.5, the gain employed at the receiver may be reduced by a factor of 2.5 in the chroma channel for both $X-Y$ and $Z-Y$ signals, and the maximum subjective noise variations produced in a color image may thereby be reduced by this same factor of approximately 2.5.

It will be obvious to those skilled in the art, in view of the above teachings, that, while employing the presently proposed relationship between proportionality factors $K_X$ and $K_Z$, the absolute magnitude of the resultant subcarrier signal transmitted may be adjusted in any manner which is optimal for a particular application. Thus, while curves $h$ and $i$ have been shown to illustrate two particular conditions, other adjustments of the absolute magnitude of the subcarrier amplitude may be made, which may be such that the maximum subcarrier amplitude lies intermediate the values represented by vectors $V_2$ and $V_3$, or even such that it is greater or smaller than either of these vectors. In any case, the arrangement of the proportionality factors employed in the subcarrier channel of the transmission system utilized in our invention results in an improvement in system performance with respect to the adjustments formerly employed, when both compatibility and subjective noise considerations are evaluated.

In the foregoing, the invention has been described with particular reference to a system in which a Y signal is derived at the transmitter and utilized at the receiver to control the production of a black-and-white image having the brightness of the colors to be represented, in which the chroma is represented by $(X-Y)$ and $(Z-Y)$ signals, in which the $(X-Y)$ and $(Z-Y)$ signals are transmitted by amplitude-modulation of subcarrier signals of equal frequency in phase quadrature, and in which the $(X-Y)$ and $(Z-Y)$ signals are separated at the receiver and supplied through an appropriate matrix network to effect deviations of the image from white so as to reproduce chroma of the televised scene. However, from the foregoing description, it will be obvious to one skilled in the art that the invention is applicable to other systems which differ in their detailed structure and arrangement, and that such other variant systems may suitably be utilized in other applications of the invention.

For example, one may employ a system in which signals proportional to the X, Y and Z values of image elements are transmitted to a receiver, wherein they may be supplied in appropriate amounts to the image-reproducing apparatus. In this event, the proportionality constant relating the transmitted X signal variations to variations in only the X values of colors, may advantageously be made to exceed the proportionality factor relating the transmitted Z signal variations to variations in only the Z values of the same colors, by the hereinbefore-specified factor R. Further, the $(X-Y)$ and $(Z-Y)$ signals need not be transmitted upon subcarrier components having phases which differ by 90°, since other phase relations may be employed provided that the phasing of the synchronous detecting arrangement at the receiver is correspondingly adjusted. As has been indicated hereinbefore, it is not even essential that the received subcarrier signal be separated into separate portions, since the composite subcarrier signal may be applied to a single tricolor striped-phosphor cathode ray tube in the manner described in the above-cited application of Creamer and Partin.

In general, in any of a large variety of transmission systems for translating intelligence as to color specifications and for controlling the reproduction of a color image at receiver, the transmitted signals will contain a certain component effective to control variations in the X values of the reproduced image, and another component effective to control variations in the Z value thereof. These signal components may be subjected to a variety of operations before application to the image-reproducing apparatus in the proper proportions to produce a faithful color reproduction. Nevertheless, so long as the component in the transmitted signal representative of X variations is related to X variations in the original image by a proportionality factor $K_X$, and that component representative of variations in Z values is related to Z variations of the original image by a proportionality factor $K_Z$, where $K_X/K_Z$ equals the ratio R defined hereinbefore, and so long as the receiver is arranged to utilize these signals to effect faithful image reproduction, the details of the structural mechanisms by which these operations are accomplished may differ widely in different applications without departing from the spirit of the present invention.

The invention has also been described with reference to its utility in producing visual effects in the optical-perceptive system of a normal human observer. The manner in which the system may be modified to provide optimum performance in special cases in which the received, color-specifying signals are to be used as stimuli for abnormal human observers, or for inanimate, signal-responsive mechanisms, for example, will also be apparent from a knowledge of the relative responsiveness of the stimulated member to chromaticity changes of various types.

We claim:

1. In a system for the generation of signals representative of the colors of an original image: first means for generating a first signal containing amplitude variations related by a first proportionality constant $K_X$ to variations in only the standard colorimetric X values of said colors; second means for generating a second signal containing amplitude variations related by a second proportionality constant $K_Z$ to variations in only the standard colorimetric Z values of said colors; said proportionality constant $K_X$ being substantially three times greater than said proportionality constant $K_Z$; means for generating a pair of carrier-wave signals of the same frequency but differing phase; and means for amplitude-modulating one of said carrier-wave signals with said first signal and for modulating the other of said carrier-wave signals with said second signal.

2. A system in accordance with claim 1, in which said pair of carrier-wave signals are in phase quadrature relationship.

3. A system in accordance with claim 1, comprising in addition means for transmitting said two amplitude-modulated carrier-wave signals.

4. In a system for the transmission of signals representative of colors specifiable by their standard colorimetric X, Y and Z values: first means for producing a first signal whose variations are related by a first proportionality constant to variations in the $X-Y$ values of colors to be represented, said $X-Y$ values equalling the differences between said standard X values and said standard Y values of said colors; second means for producing a second signal whose variations are related by a second proportionality constant to variations in the $Z-Y$ values of said colors, said $Z-Y$ values equalling the differences between said standard Z values and said standard Y values of said colors; said first proportionality constant being substantially three times greater than said second proportionality constant; and means for transmitting said first and second signals as a chroma-representing transmission.

5. In a system for the transmission of signals representative of colors specifiable in terms of their standard colorimetric X, Y and Z values; means for producing a first subcarrier oscillation; means for producing a first color-representing signal whose variations are substantially proportional to variations in the $X-Y$ values of colors to be represented, said $X-Y$ values equalling the differences between said standard X values and said standard Y values of said colors; means for amplitude-modulating said first-subcarrier signal with said color-representing signal to produce variations in the amplitude of said first subcarrier oscillation which are related to said variations in the $X-Y$ values of colors to be represented by a first proportionality constant $K_X$; means for producing a second subcarrier oscillation; means for producing a second color-representing signal whose variations are substantially proportional to variations in the $Z-Y$ values of said colors, said $Z-Y$ values equalling the differences between said standard Z values and said standard Y values of said colors; means for amplitude-modulating said second subcarrier signal with said second color-representing signal to produce amplitude variations therein which are related to said $Z-Y$ value variations by a second proportionality constant $K_Z$; said constant $K_X$ exceeding said constant $K_Z$ by a factor substantially equal to three; and means for transmitting said first and second amplitude-modulated subcarrier signals.

6. The system of claim 5, comprising, in addition, means for generating and for transmitting a third color-specifying signal representative of variations in the brightnesses of said colors.

7. The system of claim 6, comprising, in addition, frequency-selective means responsive to said first, said second and said third color-specifying signals for limiting said first and second color-representing signals to frequency bands which are substantially narrower than that of said brightness-representing signal.

8. The system of claim 7, comprising, in addition, means for suppressing said first and second subcarrier oscillations, respectively, when said $X-Y$ and said $Z-Y$ values are substantially of zero value.

9. The system of claim 8, in which said frequency-selective means comprises a first low-pass filter supplied with said brightness-representing signal and having an upper frequency cut-off $f_H$, and a second bandpass filter supplied with said first and said second color-representing signals and having an upper frequency cut-off $f_C$, and in which said subcarrier oscillations are at a frequency substantially equal to the sum of $f_H$ and $f_C$.

10. In a system for generating color-representing transmissions: camera means for producing separate X, Y and Z signals which vary in proportion to the standard colorimetric X, Y and Z values, respectively, of the light from a scene whose color is to be represented; means for combining subtractively said X and said Y signals to produce an $X-Y$ signal which varies in proportion to differences between said X and Y values of said colors; means for generating a first subcarrier oscillation and for amplitude-modulating said first subcarrier signal with said $X-Y$ signal; means for combining subtractively said Z signal and said Y signal to produce a $Z-Y$ signal whose variations are substantially proportional to variations in the differences between said Z and Y values of said colors; means for generating a second subcarrier oscillation and for amplitude-modulating said second subcarrier oscillation with said $Z-Y$ signals; signal combining means for combining said Y signal, said first amplitude-modulated subcarrier oscillation and said second amplitude-modulated subcarrier oscillation, to produce a combined signal representative of the color of said light; and gain-determining means providing a ratio of substantially three between the proportionality factor relating the amplitude-variations in said first subcarrier oscillation to said differences in X and Y values of said colors and the proportionality factor relating the amplitude variations in said second subcarrier signal to said differences in Z and Y values of said colors; and means for transmitting said combined signal as a color-representing transmission.

11. The system of claim 10, comprising, in addition, a source of a white illuminant for illuminating said scene.

12. In a system for reproducing at a remote point the chromaticity of an original color image: means for transmitting a first signal component whose variations are related to variations in only the standard colorimetric Z values of said original color image by a first proportionality constant $K_Z$, and for transmitting a second signal component whose variations are related to variations in only the standard colorimetric X values of said image by a second proportionality constant $K_X$, said second proportionality constant exceeding said first proportionality constant by a predetermined factor which is substantially equal to three; a receiver comprising an image-reproducing section responsive to signals representative of variations in said X and Z values of said original image to reproduce the chromaticity of said image, said receiver also comprising means for receiving said first and second signal components and for supplying them to said image-reproducing section to control said reproduction of said image chromaticity; and means included in said receiver for reducing said second signal component, relative to said first signal component, by substantially said predetermined factor of three.

13. In a color television system: a receiver comprising an image-reproducing portion, said image-reproducing portion being responsive to color-specifying signals representative of the standard colorimetric X and Z values of an original image to form a reproduced image having substantially the same chromaticity as said original image; a transmitter for generating color-specifying signals whose variations are related to variations in only said X and Z values of said original image by proportionality constants $K_X$ and $K_Z$, respectively, said constants being determined by the relative gains accorded said color-specifying signals respectively; a signal-transmission channel for supplying said color-specifying signals from said transmitter to said image-reproducing portion of said receiver, said transmission channel being subject to electrical interference injected into predetermined portions thereof; gain-determining means situated anterior to said portions of said transmission channel into which said interference is injected, for augmenting said signal variations produced in response to variations in said X value of said original image, relative to signal variations produced in response to variations in said Z values thereof, by an amount such that said constant $K_X$ exceeds said constant $K_Z$ by a factor substantially equal to three; and means situated in said transmission channel at a point following said portions thereof into which interference is injected, for reducing signal variations produced by said variations in said X values, relative to signal variations produced in response to variations in said Z values, by said factor of three.

14. In a color television system: means for producing a first color-specifying signal whose variations are related to variations in the $X-Y$ values of light from an original scene by a first proportionality constant, said $X-Y$ values being equal to the differences between the standard colorimetric X and Y values of said light; means for producing a second color-specifying signal whose variations are related to variations in the $Z-Y$ values of said light by a second proportionality constant, said $Z-Y$ values being equal to differences between the standard colorimetric Z and Y values of said light, said first constant exceeding said second constant by a factor substantially equal to three; a receiver comprising an image-reproducing section responsive to signals related by substantially identical proportionality constants to said $X-Y$ and $Z-Y$ values of said light, to form a reproduced image having substantially the same chromaticity as said light from said original scene; means for transmitting said first and second color-representing signals to said image-reproducing section of said receiver to control the formation of said reproduced image; and means included in said receiver for reducing the strength of said $X-Y$ signals, relative to that of said $Z-Y$ signals, by said factor of three.

15. The system of claim 14, in which said means for producing said first signal and said means for producing said second signal includes respectively, first and second gain-determining means, the gain provided by said first gain-determining means exceeding that provided by said second gain-determining means by a factor substantially equal to three.

16. A system in accordance with claim 14, comprising in addition, means for transmitting said color-specifying signals by amplitude-modulation of a pair of subcarrier signals of the same frequency but of different phases.

17. In a color television receiving system, means for receiving a first signal component representative of variations in the standard colorimetric X values of colors to be reproduced and for receiving a second signal component representative of variations in the standard colorimetric Z values of said colors, means for amplifying said first signal component by a first factor and said second signal component by a second factor, said second factor exceeding said first factor substantially in the ratio of three to one, and image reproducing means supplied with said amplified signal components and responsive thereto to effect reproduction of the chromaticity of said colors.

18. In a system for reproducing a color television image: means for receiving a signal comprising variations representative of the standard colorimetric X values of colors to be reproduced and also comprising other variations representative of the standard colorimetric Z values of said colors; means for amplifying said X-representing variations by a first factor, and for amplifying said Z-representing variations by a second factor, said second factor exceeding said first factor by a ratio substantially equal to three; and image-reproducing means supplied with said amplified signal variations and responsive thereto to effect reproduction of the chromaticity of said colors.

19. In a system for reproducing a color television image: means for receiving a signal comprising variations related to variations in the standard colorimetric X values of colors to be reproduced by a first proportionality constant $K_X$, and also comprising variations related to the standard colorimetric Z values of said colors by a second proportionality constant $K_Z$, said constant $K_X$ exceeding said constant $K_Z$ by a factor substantially equal to three; image-reproducing means responsive to signals whose variations are related to variations in the standard colorimetric X and Z values of colors by the same proportionality constant to reproduce the chromaticity of said last-named colors; amplitude-modifying means for increasing the amplitudes of said Z related variations of said received signals relative to the amplitudes of said X related variations of said received signals, by said factor of three; and means for supplying said received signals of modified amplitude to said image-reproducing means to effect reproduction of the chromaticity of said color image.

20. In a system for reproducing a color television image: means for receiving an X-representing signal component comprising variations related to variations in the standard colorimetric X values of colors to be reproduced by a first proportionality constant $K_X$, and for receiving a Z-representing signal component comprising variations related to the standard colorimetric Z values of said colors by a second proportionality constant $K_Z$, said constant $K_X$ exceeding said constant $K_Z$ by a factor substantially equal to three; image-reproducing means supplied with said received signal components and comprising a source of light of a plurality of primary colors, said last-named means being responsive to equal variations in said X-representing signal component and said Z-representing signal component to produce unequal variations in the standard colorimetric X and Z values of said light, said last-named Z variations exceeding said last-named X variations by a factor substantially equal to said factor of three.

21. The apparatus of claim 20, in which said image-reproducing means comprises a pair of input terminals, and in which said receiving means comprises apparatus for separating said X-representing and said Z-representing signal components, for supplying said separated X-representing signal component to one of said input terminals, and for supplying said separated Z-representing signal component to the other of said input terminals.

References Cited in the file of this patent

UNITED STATES PATENTS

| | | |
|---|---|---|
| 2,535,552 | Schroeder | Dec. 26, 1950 |
| 2,554,693 | Bedford | May 29, 1951 |
| 2,595,553 | Weimer | May 6, 1952 |
| 2,596,918 | Schroeder | May 13, 1952 |
| 2,657,253 | Bedford | Oct. 27, 1953 |
| 2,728,813 | Loughlin | Dec. 27, 1955 |

OTHER REFERENCES

"Mixed Highs in Simultaneous Color Television," RCA Bulletin, July 1950.